Patented June 23, 1953

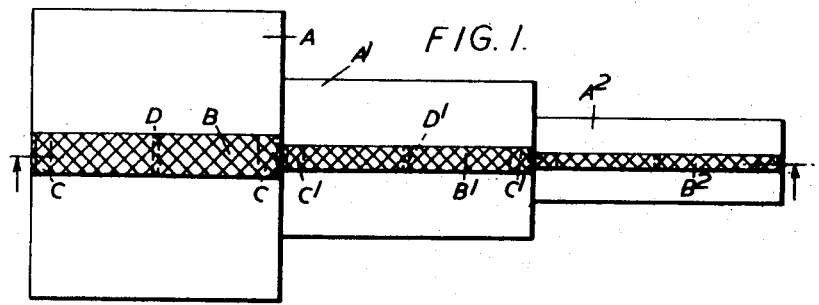
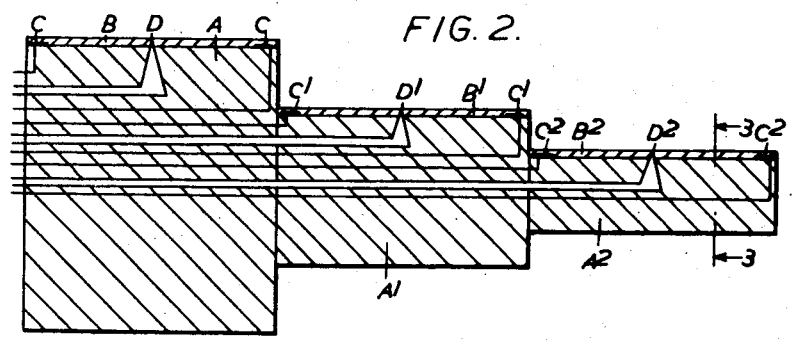
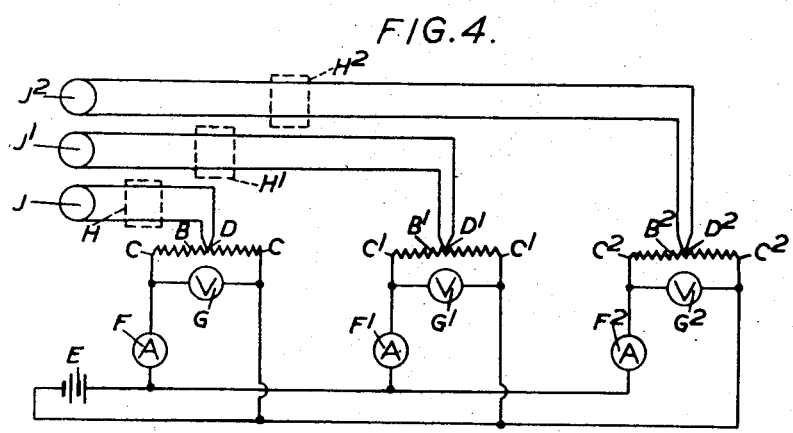
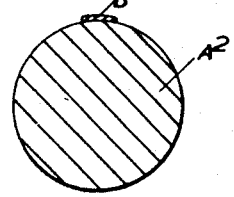
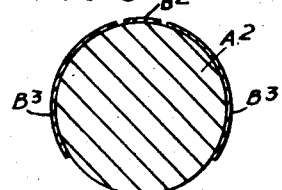

2,642,737

UNITED STATES PATENT OFFICE 2,642,737

APPARATUS FOR INVESTIGATING THE WATER CONTENT OF A GAS

John Kinsella, Luton, England, assignor to D. Napier & Son Limited, London, England, a company of Great Britain Application December 27, 1949, Serial No. 135,058
In Great Britain January 4, 1949

4 Claims. (Cl. 73—29)

1

This invention relates to apparatus for investigating the water content of a gas and more particularly for use on aircraft for investigating the water content of the atmosphere under what are generally called "icing conditions," that is to say conditions in which water droplets in the atmosphere tend to turn into ice on the surfaces of the aircraft on which they impinge.

The invention is concerned with apparatus of the kind comprising one or more impingement elements, which as at present used are in the form of metal cylinders to each of which heat is applied electrically while the temperature at predetermined points in the surface of each of which is measured. In such apparatus measurement of the heat input into each cylinder and the temperature of the appropriate part or parts of the surface of the cylinder gives a measure of the amount of cooling to which the cylinder is subject due to the evaporation of water therefrom and hence to the quantity of water which is impinging thereon. Thus an indication of the quantity of water in the atmosphere is given.

In the known apparatus referred to above a number of cylinders of different diameters are employed and, since the flow pattern around a cylinder, governed by the air velocity and cylinder diameter, determines the minimum size of droplet which impinges on that cylinder, such an arrangement, by a judicious determination of the diameters of the various cylinders, enables an indication to be obtained of the proportion of droplets of various ranges of sizes of which the total water content is made up.

Although in the prior arrangement referred to above a number of cylinders of different diameter are used it is to be understood that the present invention may be applied to apparatus of the kind referred to, whether a single impingement element or two or more such elements are used and whether these elements are in the form of cylinders or not.

In apparatus of the kind referred to for investigating the water content of a gas according to the present invention, the impingement element or each of the impingement elements comprises a support, which may be of cylindrical or other suitable form, formed of a material having comparatively poor heat conductivity and of an electrical insulating character, an electrical resistance element in the form of a thin metallic layer applied to the surface of the impingement element so as to adhere to it, electrical terminals by which the layer can be connected to a source of electric current the passage of which through

2 the metallic layer will serve to heat it, and one or more thermo-couples in close heat-conducting contact with the metallic layer to enable the temperature of predetermined parts of the layer to be determined.

Preferably the metallic layer is applied to the impingement element or each impingement element by metal spraying, the metal being either of a kind having a comparatively high electrical resistance or not. In this connection it has been found that the electrical resistance of a metallic layer applied by spraying is considerably higher than that of a similar layer of normal metal foil, and this has to be taken into account in determining the dimensions of the layer which should be applied to give a given resistance.

Preferably the thermo-couples are embedded in the surface of the support or each support before the application of the metallic layer or layers thereto with their junctions initially protruding in a radial direction at the points where the temperature is to be measured, these junctions being then smoothed down so that they are flush with the surface of the metallic layer while being in intimate heat-conducting contact therewith.

Further, terminal members constituting busbars are conveniently embedded in the surface of the impingement element or each impingement element at points such that the metallic layer applied to the surface overlaps the busbars and the latter then form connections by which the appropriate points in the metallic layer can be connected to the source of electric current.

It will usually be convenient to form the impingement elements in apparatus according to the invention in the form of cylinders, and one such arrangement according to the invention is illustrated somewhat diagrammatically by way of example in the accompanying drawings, in which Figure 1 is a front elevation of an impingement element employed in apparatus according to the invention, Figure 2 is a cross-section through the impingement element shown in Figure 1 in a horizontal plane containing the axis of the impingement element, Figure 3 is a cross-section on the line 3—3 of Figure 2, Figure 4 is a wiring diagram showing the circuit connections of the apparatus, and Figure 5 is a similar view to Figure 3 showing a modification.

In the construction illustrated in Figures 1 to 4 the apparatus comprises an impingement element consisting of a support formed of some electrical insulating material of poor heat conductivity such as a suitable plastic material and having three cylindrical sections A, $A^1$, $A^2$ of different diameters as shown, each constituting in effect an impingement element. Applied to the surface of the section A is a strip-like layer of sprayed aluminium B the ends of which extend over and make close metallic contact with metallic terminals or contacts C embedded in the surface of the section A, while the centre of the strip B is in close contact with the junction of a thermocouple D.

Similarly applied to the section $A^1$ is a strip-like layer of sprayed aluminium $B^1$ extending between terminals $C^1$ and in close contact with the junction of a thermocouple $D^1$.

The section $A^2$ also has a strip of sprayed aluminium $B^2$ applied to its surface making contact at its ends with terminals $C^2$ and at its centre with the junction of a thermocouple $D^2$.

It will be seen that the widths of the strips B, $B^1$ and $B^2$ are different, these widths being chosen in relation to the approximate range of speeds of the gas with which the apparatus is to be used so as to be limited approximately to the area on which liquid particles in the gas will tend to impinge upon the surfaces respectively of the sections A, $A^1$ and $A^2$.

The terminals C, $C^1$ and $C^2$ are connected as indicated in Figure 4 to a source of electric supply indicated diagrammatically at E so as to cause electric current for heating purposes to pass through the strips B, $B^1$ and $B^2$ and thus heat them. Ammeters F, $F^1$, $F^2$ and voltmeters G, $G^1$, $G^2$ are arranged in the circuits of the three strips B, $B^1$, $B^2$ as shown so as to enable readings indicating the current flow through these strips to be taken.

The thermocouples D, $D^1$, $D^2$ are connected, either directly or through suitable amplifying devices indicated at H, $H^1$, $H^2$ to milliameters or similar devices J, $J^1$, $J^2$ sensitive to variations in the E. M. F.'s generated by the thermocouples, whereby the temperature of the strips B, $B^1$, $B^2$ can be determined.

It will be understood that the impingement element A, $A^1$, $A^2$ is supported in the gas stream under investigation so that the strips B, $B^1$, $B^2$ directly face the direction from which the gas stream approaches the element. It will be seen, therefore, that when the apparatus is in operation variations in the unevaporated water content of the gas will cause variations in the rate of impingement of water on and hence of extraction of heat from the strips B, $B^1$, $B^2$ so as to cause variations in the temperatures of the strips which will be indicated by variations in the readings of the milliameters J, $J^1$, $J^2$.

Moreover it will be seen that the heating of the strips B, $B^1$, $B^2$ by the direct passage of current through them provides a simple arrangement and one enabling the strips B, $B^1$, $B^2$ to form virtually parts of the surfaces of the support A, $A^1$, $A^2$. Further these strips B, $B^1$, $B^2$ will have very limited heat capacity so that changes in the rate at which heat is extracted from them by the gas and water particles impinging upon them in relation to the rate at which heat is imparted to them by the flow of current through them will produce a rapid response in the form of temperature change in the strips either in the upward or downward direction.

Again, by limiting the metallic layers B, $B^1$, $B^2$ approximately to the area on which liquid carried by the gas under investigation will tend to impinge and thus also limiting the heating to this area, it is possible to determine with more accuracy the quantity of heat being dissipated by evaporation and convection from the interesting part of the surface of the impingement element since substantially the whole of the surface which is being heated and from which the reading is taken has its temperature materially affected by changes in the condition of the gas in question.

It will therefore be seen that with the present invention the heat capacity of the metallic layer or layers is very small and heat is applied thereto directly by the passage of electric current therethrough so that their temperatures will respond rapidly in either direction to changes in the cooling applied to them due to changes in the water content of the air impinging on them. Further, the thermocouples are embedded directly in the heated metallic layer and will thus tend to record the exact temperature of this layer, making the usual allowance for the temperature gradient along the thermocouple leads.

It will also be understood that with the arrangement shown in the drawings, the minimum size of droplet of water in suspension in the gas under investigation which will impinge on the three sections A, $A^1$ and $A^2$ is different for the different sections owing to their different diameters whereby readings obtained from the apparatus will also give information as to the proportions of larger, smaller and intermediate sized droplets in the gas.

A typical example of the temperature at which a metallic layer in apparatus according to the invention may be maintained under operating conditions would be about 45° C. when the temperature of air impinging on it is −0.3° C.

In the modification shown in Figure 5 additional separate metallic layers $B^3$ are provided to prevent formation of ice on the parts of the support $A^2$ above and below the strip $B^2$.

What I claim as my invention and desire to secure by Letters Patent is:

1. Apparatus for investigating the liquid water content of a gas stream comprising at least one cylinder of low heat conductivity electrical insulating material, metallic electric terminals embedded in the surface of the cylinder, a thermocouple embedded in the surface of the cylinder with its junction projecting a small distance beyond such surface, a metallic layer applied to a limited area of the upstream surface of the cylinder and overlapping and making intimate contact with the electrical terminals and the junction of the thermocouple, means for connecting the terminals to a source of electric current whereby a heating current may be passed through the metallic layer and means for connecting the thermocouple to apparatus sensitive to the electro-motive force generated by it.

2. Apparatus for investigating the liquid water content of a gas stream as claimed in claim 1 in which the metallic layer is in the form of a strip extending longitudinally along the cylinder and of such limited circumferential width as to be restricted substantially to that part of the circumference of the cylinder on which liquid particles in the gas impinging upon the cylinder will impinge.

3. Apparatus for investigating the water content of a gas as claimed in claim 2 in which the metallic layer is in the form of a sprayed-on metal.

4. Apparatus for investigating the water content of a gas including in combination a support having two cylindrical parts of different diameters formed of a material of known heat conductivity and of an electric insulating character, a metallic strip applied to the surface of each cylindrical part with the centre lines of the strips lying in longitudinal alignment with one another, the circumferential width of the strip on the larger cylindrical part being greater than the circumferential width of the strip on the smaller cylindrical part, electric contacts embedded in each cylindrical part and with which the opposite ends of the metallic strip on such part makes contact, means for connecting the two contacts engaging each strip to a source of electric current whereby heating current can be caused to pass through the strip, at least one thermocouple associated with each strip with its junction lying in close heat conducting contact with the strip, means for measuring the current passed through each of the strips and means connected to each thermocouple responsive to variations in the electro-motive force generated by that thermocouple.

JOHN KINSELLA.

References Cited in the file of this patent

UNITED STATES PATENTS

| Number | Name | Date |
| --- | --- | --- |
| 2,119,680 | Long | June 7, 1938 |
| 2,413,565 | Hewlett | Dec. 31, 1946 |
| 2,508,572 | Hulsberg | May 23, 1950 |